April 15, 1958     E. P. WARNKEN     2,830,647
MACHINE FOR MAKING A COMPRESSOR BLADE
Original Filed Oct. 14, 1952     2 Sheets-Sheet 1
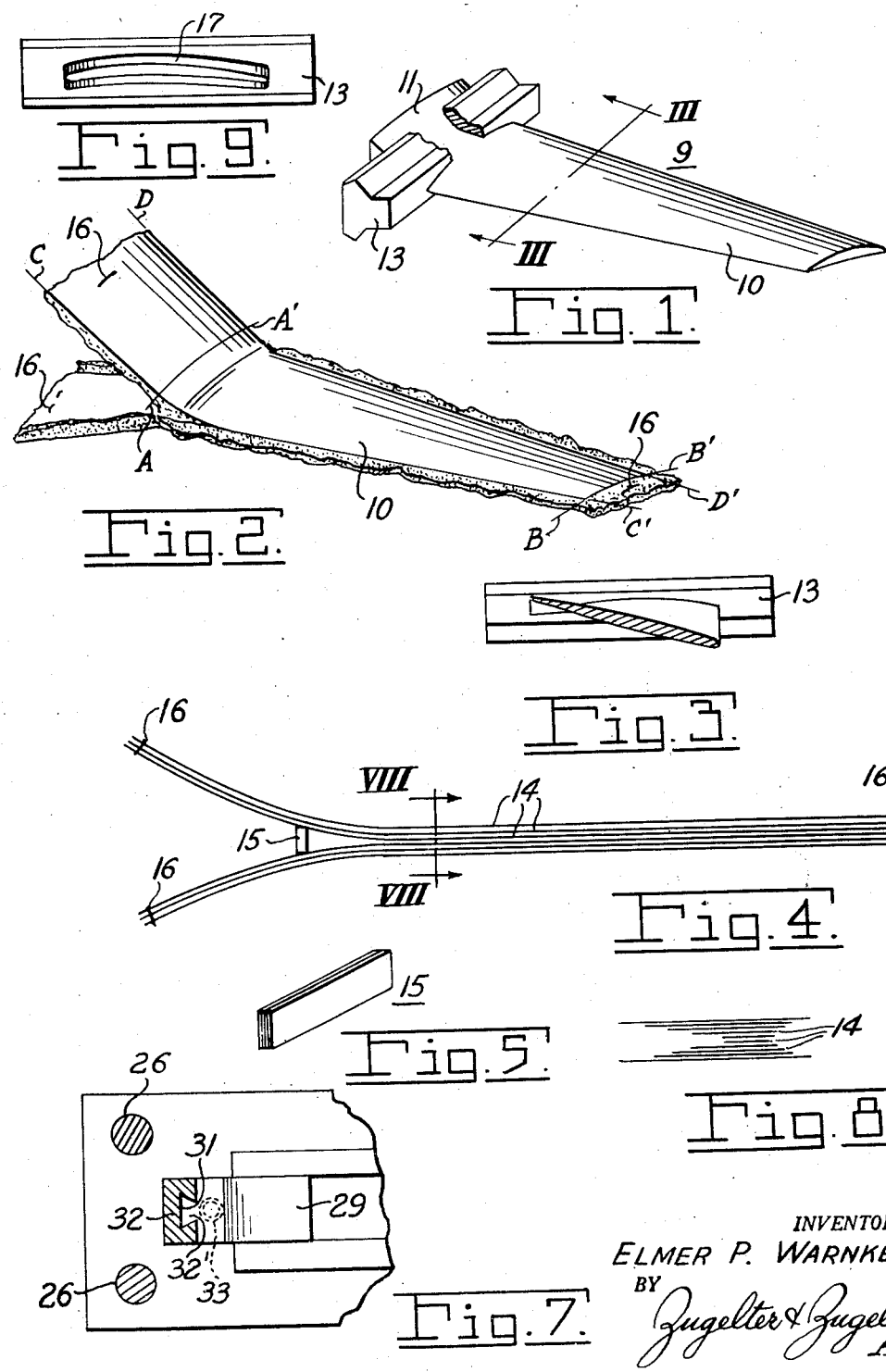

April 15, 1958   E. P. WARNKEN   2,830,647
MACHINE FOR MAKING A COMPRESSOR BLADE
Original Filed Oct. 14, 1952   2 Sheets-Sheet 2

INVENTOR.
ELMER P. WARNKEN
BY
Zugelter & Zugelter
Attys.

United States Patent Office 2,830,647
Patented Apr. 15, 1958

2,830,647

MACHINE FOR MAKING A COMPRESSOR BLADE

Elmer P. Warnken, Cincinnati, Ohio, assignor to Cincinnati Testing & Research Laboratories, Cincinnati, Ohio, a partnership Original application October 14, 1952, Serial No. 314,698. Divided and this application December 9, 1955, Serial No. 552,128

3 Claims. (Cl. 154—1)

This invention relates to compressor blades for the rotors of axial-flow air compressors, and more particularly to a machine for forming such blades.

This is a division of my co-pending application Serial No. 314,698 filed October 14, 1952.

An object of this invention is to provide a resin-impregnated laminated rotor blade having a main molded blade portion and a thickened portion at one end thereof by means of which the blade may be mounted in place on the rotor of an air compressor.

A further object of this invention is to provide a blade formed from a plurality of laminations mounted one on the other but separated into two portions at one end of the blade, so that the end of the blade is thickened.

A further object of this invention is to provide a compressor blade having diverging end portions between which is disposed a molded plug which holds the laminations apart at the end to form a strong thickened root or end portion.

A further object of this invention is to provide a machine for manufacturing such a blade having two main dies for forming the main portion of the blade and an intermediate die which extends between portions of laminations during molding to cause the laminations to diverge at one end of the blade to form the thickened end.

The above and other objects and features of this invention will in part be apparent and will in part be obvious from the following detailed description and the drawings, in which:

Figure 1 is a perspective view of a compressor blade constructed in accordance with an embodiment of this invention with a root-holding member being shown mounted on the blade;

Fig. 2 is a perspective view of the blade in the form assumed when removed from a mold and before excess material and flash is trimmed therefrom;

Fig. 3 is a view in section taken along line III—III in Fig. 1;

Fig. 4 is a diagrammatical view in section showing an assembly of laminations in condition for molding to form the blade shown in Fig. 1;

Fig. 5 is a perspective view of a block which spaces the laminations at one end of the blade;

Fig. 7 is an enlarged view in section taken along a line VII—VII in Fig. 6; and

Fig. 8 is a diagrammatic view in section taken along a line VIII—VIII in Fig. 4;

Fig. 9 is a plan view of a root-holding member used in mounting the blade.

Figure 6:
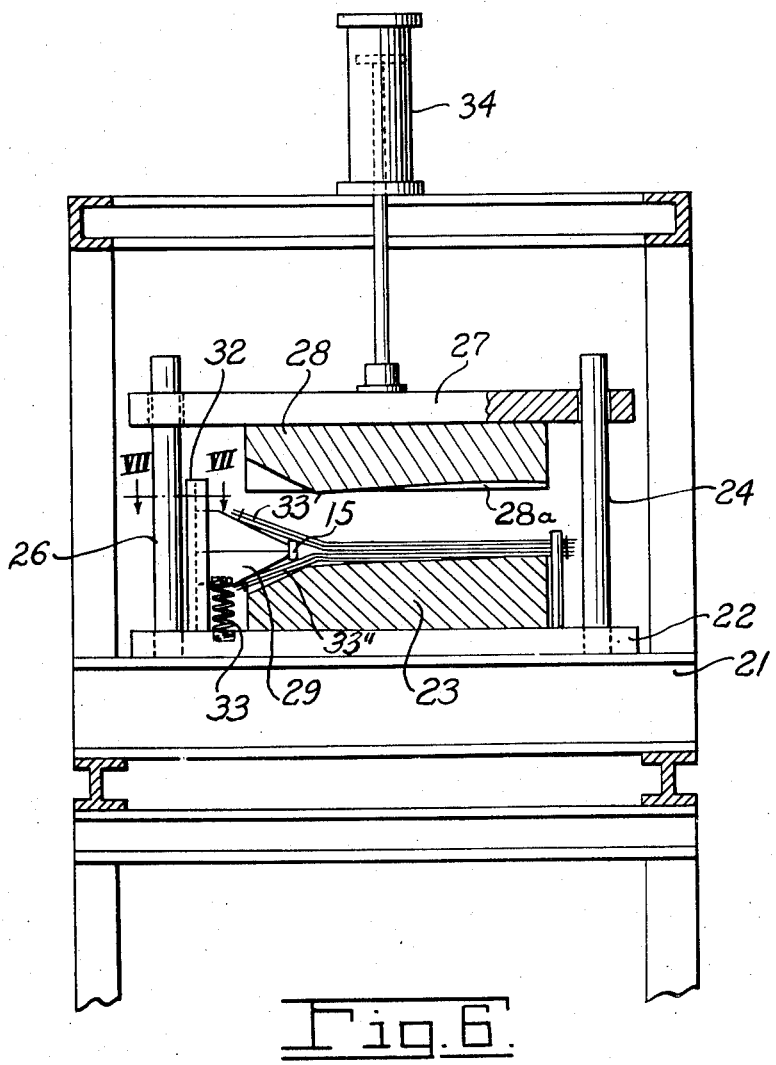
Fig. 6 is a view in section showing a machine for molding the blade.

In Fig. 1 of the drawings a rotor blade 9 for an axial-flow air compressor is shown. Blade 9 includes an impeller section 10 having a thickened end or root portion 11 on which is mounted a member 13 by means of which the blade may be mounted on and secured to the rotor of the air compressor.

The impeller section 10 and the root portion 11 are formed from a plurality of superposed layers of glass fabric 14 which are impregnated with a thermosetting resin. At the root end of the blade, the layers of fabric are separated as in Fig. 4, by a cross piece 15 composed of a plurality of superposed layers of glass fabric impregnated with the same thermosetting resin as layers 14. The tip of the blade portion 10 and the ends of the separated layers at the root are secured by staples 16. The impregnated layers of fabric and the cross piece 15 are placed in a suitable mold or press and heated to set the resin and form a rigid blade as shown in Fig. 2. The cross piece 15 being of resin impregnated laminated glass fabric sheets, it fuses into the root layers or sheets to form a strong compact root section.

After the resin has been set, the root of the blade is cut off as along the line A—A' and the flash is trimmed off on lines B—B', C—C' and D—D' to form a finished blade as in Fig. 1.

After the blade has been finished, the tip of the blade is inserted through the opening 17 in member 13 and the latter is slid back against the root.

In the diagram, only a limited number of laminations 14 are shown. However, it is to be understood that the blade forming laminations may be of any appropriate number. For example, I use approximately twelve to fourteen laminations in forming a compressor blade having its thickest part approximately one-eighth of an inch thick. The glass wool laminations may be of the type described in my co-pending application Serial No. 154,333 filed April 6, 1950, now U. S. Patent 2,746,514 with inner laminations of relatively coarse glass wool cloth while the outermost laminations are of relatively closely woven glass wool cloth.

A machine for use in molding the blade is illustrated in Figs. 6 and 7. The machine includes a framework 21 on which is mounted a base plate 22. Plate 22 carries a main stationary die 23 and posts 24 and 26 at opposite ends of stationary die 23. Posts 24 and 26 form guides for a movable platen 27. Platen 27 carries a main movable die 28 which has a lower or molding face 28a adapted to co-operate with the upwardly facing molding face of die 23.

The root end of the blade is formed around an intermediate die 29. Die 29 projects between main stationary die 23 and main movable die 28. As shown in Fig. 6, the left hand ends of the main dies diverge on opposite sides of intermediate die 29. Intermediate die 29 is triangular in vertical section so that the end portions of the elongated laminations diverge as the sides of a triangle when the blade end is formed around the intermediate die.

Intermediate die 29 is vertically reciprocable and is mounted in a track 31 (Fig. 7) in a guide pillar 32. Track 31 is formed as shown to interlock with a dovetail 32' on the intermediate die to hold the die 29 in alignment with the main dies as the intermediate die slides up and down the track. Downward movement of intermediate die 29 is arrested by a spring 33 (see Fig. 6). Spring 33 holds intermediate die 29 normally spaced at a sufficient distance above main stationary die 23 so that an assembly of laminations such as that shown in Figs. 4 and 6 can readily be inserted between the dies with portions 33' and 33" of the laminations projecting on opposite sides of intermediate die 29 and plug 15 adjacent the right hand end of intermediate die 29 (see Fig. 6).

Movable platen 27 and main movable die 29 can be driven downwardly toward the stationary and intermediate dies by means of an appropriate hydraulic cylinder 34 and pressure connections (not shown). When movable platen 27 and movable die 29 are brought down upon the laminations, the laminations are molded between the dies to form the intermediate blade construction shown in Fig. 2. During molding, intermediate die 29 is pushed downwardly against the spring 33 so that, in effect, intermediate die 29 floats between the main dies.

As the blade is molded, the cross piece 15 is caused to flow between the portions of the elongated laminations 14 so that the cross piece or plug becomes an integral part of the finished blade, firmly holding the lamination portions 33' and 33" apart at the root end of the blade.

The root end of the blade is sufficiently strong that it is unnecessary to have any fixed connections between member 13 (Fig. 1) and the blade. The member 13 is made of metal, such as aluminum. The member 13 is slidably received upon the impeller section of the blade 9. The opening 17 in member 13 tapers, as shown in Figs. 1 and 9, and the thickened root portion of the blade 9 engages the sides of the opening 17 so that the blade is firmly gripped by the member 13.

The blade and the machine for forming the blade described above and illustrated in the drawing are subject to structural modification without departing from the spirit and scope of the appended claims.

Having described my invention, what I claim as new and desire to secure by Letters Patent is:

1. A machine for molding an airfoil blade which comprises a pair of main dies having elongated opposed die cavities, the cavities at one end of the dies having wall surfaces that diverge at an acute angle to each other, means for reciprocating at least one of the main dies toward and away from the other main die, a track adjacent the diverging wall surfaces of the main die cavities and extending parallel to the direction of reciprocation of the reciprocating main die, an intermediate die mounted for reciprocation on said track, guide members extending parallel to said track between the main dies to guide the movable main die for movement parallel to movement of the intermediate die, said intermediate die having a wedge-shaped portion projecting cantilever-fashion between said diverging wall surfaces, the opposite faces of the wedge-shaped portion being substantially parallel to and adjacent the diverging wall surfaces of the main dies, and a spring urging the intermediate die to a position between and in spaced relation to the main dies when the main dies are open, the spring yielding when the main movable die is closed to molding position.

2. A machine for molding an airfoil blade which comprises a pair of main dies having elongated opposed die cavities, the main dies being mounted one above the other, the cavities at one end of the dies having wall surfaces that diverge at an acute angle to each other, means for reciprocating at least one of the main dies vertically toward and away from the other main die, a substantially vertical track adjacent the diverging wall surfaces of the main die cavities and extending parallel to the direction of reciprocation of the reciprocating main die, an intermediate die mounted for reciprocation on said track, guide members extending parallel to said track between the main dies to guide the movable main die for movement parallel to movement of the intermediate die, said intermediate die having a wedge-shaped portion projecting cantilever-fashion between said diverging wall surfaces, the opposite faces of the wedge-shaped portion being substantially parallel to and adjacent the diverging wall surfaces of the main dies, and a compression spring extending between the lower main die and the intermediate die, urging the intermediate die to a position between and in spaced relation to the main dies when the main dies are open, the spring yielding when the main movable die is closed to molding position.

3. A machine for molding an airfoil blade which comprises a frame, an upwardly facing stationary main die mounted on the frame, a downwardly facing movable main die mounted above the stationary main die, the dies having elongated opposed die cavities, the cavities at one end of the dies having wall surfaces that diverge at an acute angle to each other, means for reciprocating the movable main die toward and away from the stationary main die, upright guides mounted on the frame for guiding the movable main die, an upright keyway member mounted on the frame adjacent the diverging end portions of the main die cavities and having a keyway parallel to the guides, an intermediate die member having a die portion and a shank, there being a key on the shank in engagement with the keyway to guide the intermediate die for reciprocation, the die portion of the intermediate die being wedge-shaped and projecting cantilever-fashion between the diverging wall surfaces, the opposite faces of the wedge-shaped portion being substantially parallel to and adjacent the diverging wall surfaces of the main dies, and a spring urging the intermediate die to a position between and spaced in relation to the main dies when the main dies are open, the spring yielding when the main movable die is closed to molding position.

References Cited in the file of this patent

UNITED STATES PATENTS

| | | |
|---|---|---|
| 809,143 | Schutz | Jan. 2, 1906 |
| 2,431,943 | Land et al. | Dec. 2, 1947 |